United States Patent
Munoz et al.

(10) Patent No.: US 12,359,909 B2
(45) Date of Patent: Jul. 15, 2025

(54) UNIFORM MACHINED PARTS INSPECTION PROCESS

(71) Applicant: Rolls-Royce Corporation, Indianapolis, IN (US)

(72) Inventors: Monica Sy Munoz, Indianapolis, IN (US); Matthew Roman McHugh, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 400 days.

(21) Appl. No.: 17/661,445

(22) Filed: Apr. 29, 2022

(65) Prior Publication Data

US 2023/0349691 A1    Nov. 2, 2023

(51) Int. Cl.
*G01B 11/24* (2006.01)
*B23H 3/00* (2006.01)

(52) U.S. Cl.
CPC .............. *G01B 11/24* (2013.01); *B23H 3/00* (2013.01)

(58) Field of Classification Search
CPC ................................. G01B 21/20; B23H 3/00
See application file for complete search history.

(56) References Cited

U.S. PATENT DOCUMENTS

2017/0337705 A1* 11/2017 Bendall .................. G01B 11/24
2020/0292305 A1* 9/2020 Wagaj ................. G01B 11/2416

OTHER PUBLICATIONS

Kim, S. H., Choi, S. G., Choi, W. K., Yang, B. Y., & Lee, E. S. (2014). Pulse electrochemical machining on Invar alloy: Optical microscopic/SEM and non-contact 3D measurement study of surface analyses. Applied surface science, 314, 822-831 (Year: 2014).*
Precision Chucks, Co-op Tool Production Workholding Apr. 2020, https://www.productionworkholding.com/precision-chucks/ (Year: 2020).*

* cited by examiner

*Primary Examiner* — Son T Le
*Assistant Examiner* — Brian Butler Geiss
(74) *Attorney, Agent, or Firm* — Shumaker & Sieffert, P.A.

(57) ABSTRACT

Techniques are described by which to enable uniform machined parts inspection processes. A device comprising a memory and a processor may be configured to perform the techniques. The memory may store a unified scan of a workholding piece with a machined part, where the unified scan defines a coordinate system for the workholding piece. The memory may also store a reference model of the machined part. The processor may align, based on the coordinate system for the workholding piece, the unified scan of the workholding piece with the machined part to the reference model, and perform, after aligning the unified scan to the reference model, a comparison of the unified scan to the reference model. The processor may output, based on the comparison, an indication of compliance or non-compliance with the tolerances for the machined part.

20 Claims, 6 Drawing Sheets

UNIFORM MACHINED PARTS INSPECTION PROCESS

TECHNICAL FIELD

The disclosure relates to inspection processes for machined parts.

BACKGROUND

Machining processes may involve removal of material from a workpiece to form a component having a finished shape and texture. For example, pulsed electrochemical machining (pECM) is a non-contact machining process based on the principles of electrolysis. Pulsed electrochemical machining may also be referred to as precision electrochemical machining or pulse electrochemical machining. A pECM system may include a tool (the cathode) that imparts its shape into a workpiece (the anode) in a mirror image. As the tool moves toward a surface of the workpiece to be machined, a pulsed DC current may be applied to the tool and the workpiece. The tool maintains a tiny interelectrode gap (e.g., of less than about 10 microns) from the surface of the workpiece, and the workpiece dissolves anodically about the tool, taking on the complementary shape of the tool. An electrolyte pumped between the tool and the workpiece may remove dissolved metal from the workpiece and heat.

Since the cathodic tool does not physically contact the anodic workpiece, pECM can produce burr-free three-dimensional shapes with little or no tool wear. pECM may be used to machine any conductive metal or alloy, and is particularly well suited for materials, such as superalloys, that are difficult to machine through conventional machining. Materials commonly machined with pECM include, for example, nickel, iron, and titanium-based alloys in a variety of formats such as cast (including single crystal), forged, additively manufactured, and powdered metallurgy.

While pECM provides for precise, no contact machining for materials that are difficult to machine through conventional machining, variables that control the pECM process (e.g., timing of pulses, frequency of pulses, a distance between the cathode and the anode, etc.) can produce varying (and sometimes unpredictable) results that do not meet tolerances (such as tolerances defined by a theoretical reference model, e.g., a computer-aided design (CAD) model, for the machined part). As such, the machined part may undergo an inspection process whereby a three-dimensional (3D) scan of the machined part is compared to the CAD model to determine whether tolerances have been exceeded. This inspection process may require extensive time to complete due to potential difficulties associated with aligning coordinate systems between machined parts and workholding systems, which may delay production of the machined parts.

SUMMARY

In some examples, various aspects of the techniques are directed to a device comprising: a memory configured to store: a unified scan of a workholding piece with a machined part, the unified scan defining a coordinate system for the workholding piece; and a reference model of the machined part, the reference model defining tolerances for the machine part relative to the coordinate system for the workholding piece; and one or more processors configured to: align, based on the coordinate system for the workholding piece, the unified scan of the workholding piece with the machined part to the reference model of the workholding piece with the machined part; perform, after aligning the unified scan of the workholding piece with the machined part to reference model of the workholding piece with the machined part, a comparison of the unified scan of the workholding piece with the machined part to the reference model to inspect the tolerances for the machined part; and output, based on the comparison, an indication of compliance or non-compliance with the tolerances for the machined part.

In some examples, various aspects of the techniques are directed to a method comprising: obtaining a unified scan of a workholding piece with a machined part, the unified scan defining a coordinate system for the workholding piece; aligning, based on the coordinate system for the workholding piece, the unified scan of the workholding piece with the machined part to a reference model of the workholding piece with the machined part defining tolerances for the machine part relative to the coordinate system for the workholding piece; performing, after aligning the unified scan of the workholding piece with the machined part to the reference model of the workholding piece with the machined part, a comparison of the unified scan of the workholding piece with the machined part to the reference model to inspect the tolerances for the machined part; and outputting, based on the comparison, an indication of compliance or non-compliance with the tolerances for the machined part.

In some examples, various aspects of the techniques are directed to a non-transitory computer-readable storage medium having instructions stored thereon that, when executed, cause one or more processors to: obtain a unified scan of a workholding piece with a machined part, the unified scan defining a coordinate system for the workholding piece; align, based on the coordinate system for the workholding piece, the unified scan of the workholding piece with the machined part to a reference model of the workholding piece with the machined part defining tolerances for the machine part relative to the coordinate system for the workholding piece; perform, after aligning the unified scan of the workholding piece with the machined part to the reference model of the workholding piece with the machined part, a comparison of the unified scan of the workholding piece with the machined part to the reference model to inspect the tolerances for the machined parts; and output, based on the comparison, an indication of compliance or non-compliance with the tolerances for the machined part.

The details of one or more examples are set forth in the accompanying drawings and the description below. Other features, objects, and advantages will be apparent from the description and drawings, and from the claims.

DETAILED DESCRIPTION

The disclosure generally describes techniques that enable uniform machined parts inspection processes. Rather than resort to inaccurate inspection premised upon unaligned coordinate systems of workholding pieces and machined parts, various aspects of the techniques provide for an inspection process that facilitates inspection of machined parts using a uniform coordinate system that correctly aligns coordinate system between workholding pieces and machined parts. A computing device may implement various aspects of the techniques to enable uniform inspection of machined parts through synthesized 3D metrology scans that allow for a coordinate system to be accurately developed by which to align 3D metrology scans of machined parts with various workholding systems that are precision tooled such that the coordinate system may be reliably defined relative to the workholding systems. With knowledge of how the workholding system aligns with the machined part, the 3D metrology scan of the machined part can be imported into the coordinate system of the workholding system, which thereby provides a reference by which the computing device may automate comparisons to a reference model (such as a computer-aided design—CAD—model).

In this respect, various aspects of the techniques may improve inspection processes themselves in a manner that facilitates potentially, faster, more accurate, and reliable automated comparisons of machine part scans relative to the CAD model. The ability to import the machined part into the actual coordinate system of the workholding system may allow for machines to machine that part to the coordinate system of the actual workholding system rather than potentially needing to determine where the coordinate system of the part resides in space and adjusting the machining program to account for any differences. Importing the part into the coordinate system of the workholding system may potentially avoid trial and error to correctly account for any differences, thereby possibly improving inspection processes through uniform coordinate system alignment. In this respect, such trial and error that may result in improper inspection may be reduced if not eliminated, thereby saving time, increasing accuracy, etc. associated with inspection.

Figure 1:
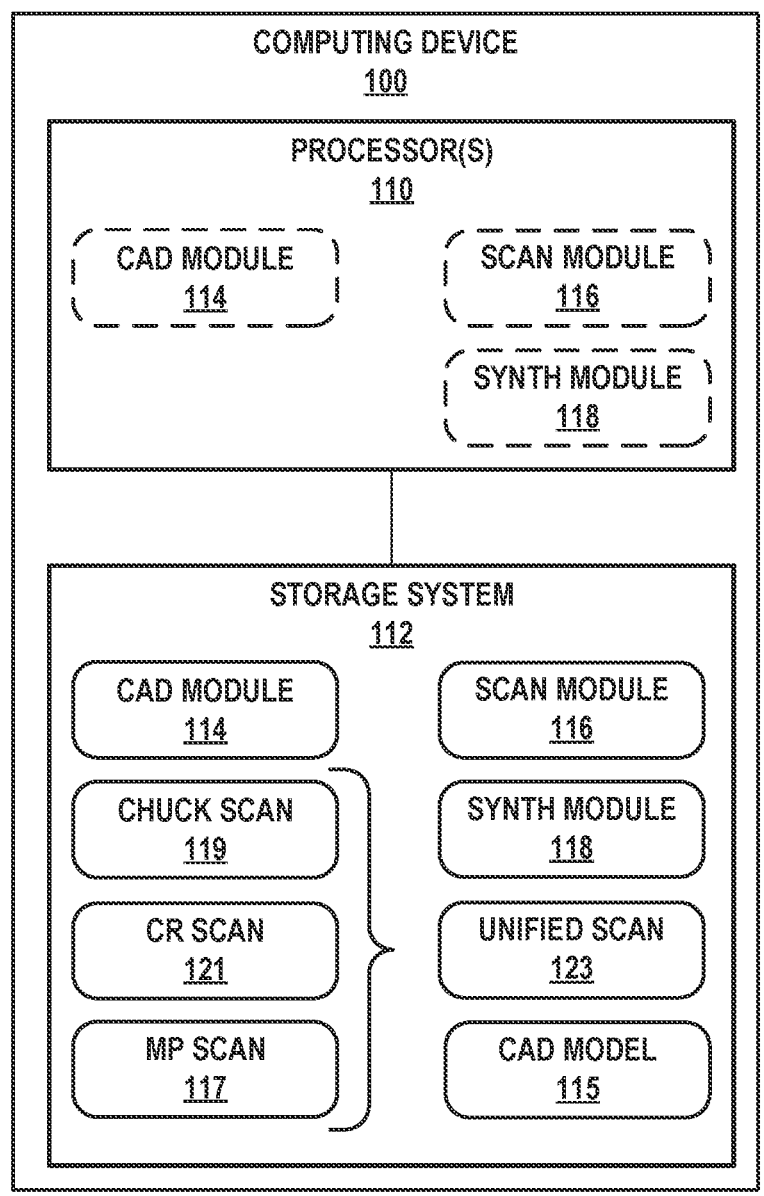
FIG. 1 is a diagram illustrating an example computing device 100 configured to perform various aspects of the inspection techniques described in this disclosure.

FIG. 1 is a diagram illustrating an example computing device 100 configured to perform various aspects of the inspection techniques described in this disclosure. As shown in the example of FIG. 1, computing device 100 may include one or more processors 110 and a storage system 112.

One or more processors 110 may implement functionality and/or execute instructions associated with computing device 100. Examples of processors 110 include application processors, microcontrollers, central processing units (CPUs), field programmable gate arrays (FPGAs), application specific integrated circuits (ASICs), graphics processing units (GPUs), display controllers, auxiliary processors, one or more sensor hubs, and any other hardware configure to function as a processor, a processing unit, or a processing device.

Modules 114-118 may be operable (or, in other words, executed) by processors 110 to perform various actions, operations, or functions of computing device 100. That is, modules 114-118 may form executable bytecode, which when executed, cause processors 110 to perform specific operations (and thereby causing computing device 100 to become a specific-purpose computer by which to operate) in accordance with various aspects of the techniques described herein. For example, processors 110 of computing device 100 may retrieve and execute instructions stored by storage system 112 that cause processors 110 to perform the operations described herein that are attributed to modules 114-118. The instructions, when executed by processors 110, may cause computing device 100 to store information within storage system 112.

Storage system 112 within computing device 100 may store information for processing during operation of computing device 100 (e.g., computing device 100 may store data accessed by modules 114-118 during execution). In some examples, storage system 112 is a temporary memory, meaning that a primary purpose of storage system 112 is not long-term storage. Storage system 112 on computing device 100 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage system 112 may, in some examples, also include one or more computer-readable storage media. Storage system 112 may include one or more non-transitory computer-readable storage mediums, which may be configured to store larger amounts of information than typically stored by volatile memory. Storage system 112 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage system 112 may store program instructions and/or information (e.g., data) associated with modules 114-116. Storage system 112 may include a memory configured to store data or other information associated with modules 114-116.

Although not shown in the example of FIG. 1, computing device 100 may include additional hardware and/or software not shown in the example of FIG. 1. For example, computing device 100 may include display devices, network interface cards (NICs), interface components (e.g., keyboards, mice, etc.), and the like, as well as software, including operating systems (OSes) that present an application space in which various applications or other modules may execute separate from the OSes, and the like.

As discussed above, processors 110 may execute a computer-aided design (CAD) module 114 and a scan module 116. In any event, CAD module 114 may represent software executed by processors 110 that facilitate definition of reference models, such as CAD model 115. CAD module 114 may specify CAD model 115 as a wireframe, mesh, solid 3D, or as other views with measurements that indicate various tolerances (within known machining limits that may be imported to CAD module 114 or otherwise manually entered by a designer). In some instances, CAD module 114 may represent a combined CAD and computer-aided manufacturing (CAM) module, which may be referred to as CAD/CAM module 114.

The designer may develop CAD model 115 using CAD/CAM module 114 with reference to a particular machining process and/or machining tool. There are a number of different machines for performing various types of machining, including computer numerical control (CNC) mills that perform face milling, shoulder milling, tapping, drilling, and turning, CNC lathes that cut rotated workpieces, CNC routers that route workpieces often in two or more dimensions, CNC plasma cutters that perform intricate cuts usually with respect to metal or other heavy materials, and CNC laser cutters that operate similar to CNC plasma cutters. In each instance, CNC machines may receive a reference model, such as CAD model 114 or some derivative thereof (which may be exported in suitable formats to the CNC machines) and automatically machine an underlying workpiece to produce a manufactured part.

As such, machining processes generally may involve removal of material from a workpiece to form a component having a finished shape and texture. Another type of machining, referred to as pulsed electrochemical machining (pECM), is a non-contact machining process based on the principles of electrolysis. Pulsed electrochemical machining may also be referred to as precision electrochemical machining or pulse electrochemical machining. A pECM system may include a tool (the cathode) that imparts its shape into a workpiece (the anode) in a mirror image. As the tool moves toward a surface of the workpiece to be machined, a pulsed DC current may be applied to the tool and the workpiece. The tool maintains a tiny interelectrode gap (e.g., of less than about 10 microns) from the surface of the workpiece, and the workpiece dissolves anodically about the tool, taking on the complementary shape of the tool. An electrolyte pumped between the tool and the workpiece may remove dissolved metal from the workpiece and heat.

Since the cathodic tool does not physically contact the anodic workpiece, pECM can produce burr-free three-dimensional shapes with little or no tool wear. pECM may be used to machine any conductive metal or alloy, and is particularly well suited for materials, such as superalloys, that are difficult to machine through conventional machining (e.g., involving contact between the tool and workpiece). Materials commonly machined with pECM include, for example, nickel, iron, and titanium-based alloys in a variety of formats such as cast (including single crystal), forged, additively manufactured, and powdered metallurgy.

While pECM provides for precise, no contact machining for materials that are difficult to machine through conventional machining, variables that control the pECM process (e.g., timing of pulses, frequency of pulses, a distance between the cathode and the anode, etc.) can produce varying (and sometimes unpredictable) results that do not meet tolerances (such as tolerances defined by a theoretical reference model, e.g., CAD model 115, for the machined part). As such, the machined part may undergo an inspection process whereby a three-dimensional (3D) scan of the machined part is compared to CAD model 115 to determine whether tolerances have been exceeded.

That is, processors 110 may invoke scan module 116 to obtain a scan of the machined part. Scan module 116 may represent a module configured to interface with a camera that may capture a 3D scan of the machined part. Various 3D metrology cameras are available by which to capture a 3D scan with high precision (potentially having a precision of 10 or less millimeters), where such cameras may utilize lasers, white light, blue light, infrared light, and various cameras to capture the 3D scan. Scan module 116 may interface with the camera (which is not shown for ease of illustration purposes) to capture a machined part (MP) scan 117 ("MP scan 117"). In some instances, MP scan 117 may include a workholding piece (such as a chuck or other clamp or fastener) along with the machined part.

The designer may next manually compare MP scan 117 to CAD model 115, verifying that MP scan 117 meets tolerances defined by CAD model 115. This inspection process may require extensive time to complete due to the manual nature of such inspection, which may delay production of the machined parts, while also being subject to human error again due to again the manual nature of such inspection. Human error may result in inspection inadvertently passing, which may lead to production of the machined parts that do not meet tolerances, thereby potentially wasting material and increasing accompanying costs.

In accordance with various aspects of the techniques described in this disclosure, computing device 100 may perform an automated inspection of MP scan 117 relative to CAD model 115. However, given that a coordinate system of MP scan 117 may differ from a coordinate system to which the machined part was machined, computing device 100 may synthesize a number of different 3D metrology scans (or other types of scans) to create a defined coordinate system relative to a workholding piece that holds the workpiece within the pECM device, thereby potentially ensuring a common coordinate system by which to perform inspection. Examples of a workholding piece may include a chuck or other type of clamp, which may be tooled to provide mostly uniform dimensions between chucks of the similar and/or same type.

Computing device 100 may implement various aspects of the techniques to enable uniform inspection of machine parts through synthesized 3D metrology scans that allow for a coordinate system to be accurately developed by which to align 3D metrology scans of machined parts with various workholding pieces that are tooled such that the coordinate system may be reliably defined relative to the workholding systems. With knowledge of how the workholding system aligns with the machined part, the 3D metrology scan of the machined part (e.g., MP scan 117) can be imported into the coordinate system of the workholding piece, which thereby provides a reference by which computing device 100 may facilitate accurate comparisons to a reference model (e.g., CAD model 115).

In operation, processors 110 may invoke scanning module 116 to obtain a number of different 3D scans, including a scan of the workholding piece (shown as chuck scan 119), a chuck reference scan (shown as CR scan 121), and MP scan 117. Again, scanning module 116 may interface with a 3D metrology scanner having a number of different image projection devices, such as lasers, blue light emitters, infrared emitters, etc., and capture devices, such as cameras, infrared sensors, blue light sensors, etc. Each of MP scan 117, chuck scan 119, and CR scan 121 may define an external geometry of the respective machined part, chuck, and chuck with a reference object (such as a metal rod having a defined geometry). The external geometry of the respective machined part, chuck, and chuck with the reference object may include a point cloud or other format compatible with representing high precision external (or in other words surface) geometry.

After obtaining scans 117-121, processors 110 may invoke synthesis module 118 (shown as "synth module 118" in the example of FIG. 1). Synthesis module 118 may generate, based on chuck scan 119 and MP scan 117 (which again may include the machined part held by the workholding piece, such as a chuck), a unified scan 123 that integrates MP scan 117 into chuck scan 119. However, synthesis module 118 may perform one or more intermediate steps to define the coordinate system relative to the workholding piece.

That is, synthesis module 118 may first process CR scan 121 to identify the coordinate system (based on the defined measurements for the reference object) relative to the chuck. Using the defined measurements of the reference object, synthesis module 118 may determine a scale for CR scan 119 and thereby define the coordinate system for chuck scan 119, importing the coordinate system determined with respect to CR scan 121 into chuck scan 119. Synthesis module 118 may next align MP scan 117 with chuck scan 119 (using the chuck or other workholding piece from MP scan 117 to form a reference to chuck scan 119) having the imported coordinate system to produce uniform scan 123 that synthesis module 118 may store to storage system 112. In other words, synthesis module 118 may use the chuck and it's coordinate system as a proxy for machine datum (or in other words as datum features).

The designer may next interface with processors 110 to cause processors 110 to execute CAD module 114. CAD module 114 may access or otherwise obtain unified scan 123 and CAD model 115, aligning, based on the coordinate system for the chuck as specified by unified scan 123, unified scan 123 to CAD model 115 (which has a nominal coordinate system based on the workholding piece). CAD model 115 may define tolerances of the machined part relative to the coordinate system relative to the chuck specified by chuck scan 119 (after being updated to import the coordinate system identified through processing CR scan 121). CAD module 114 may then perform, after aligning unified scan 123 of the workholding piece with the machined part to CAD model 115 of the machined part, a comparison of unified scan 123 to CAD model 115 to automatically inspect the tolerances for the machined part.

CAD model 115 may output, based on the comparison, an indication of compliance or non-compliance with the tolerances for machined part (e.g., as a report, list, table, etc.). If any aspects of unified scan 123 are non-compliant with the tolerances defined by CAD model 115, the designer or other process engineer may adjust various variables for the machining process (e.g., in the context of pECM, timing of pulses, frequency of pulses, a distance between the cathode and the anode, etc.). Given that each machined part can be quickly scanned, the process engineer may quickly iterate through repeated automated comparisons between each unified scan 123 for each newly created machined part and CAD model 115 to efficiently arrive at variables that achieve compliance with CAD model 115.

In this respect, various aspects of the techniques may improve inspection processes themselves in a manner that facilitates potentially, faster, more accurate, and reliable automated comparisons of MP scans, such as MP scan 117, relative to corresponding CAD models, such as CAD model 115. That is, chuck scan 119 in combination with CR scan 121 may allow computing device 100 to identify an actual coordinate system for the workholding piece, which computing device 100 may then align with MP scan 117 to create unified scan 123 that may correspond to the coordinate system of CAD model 115 (which as noted above has a nominal coordinate system based on the workholding piece). By generating unified scan 123 with the actual coordinate system based on the workholding piece, computing device 100 may automate inspection relative to CAD model 115 (as both exist in the same coordinate system).

In other words, the ability to import the machined part into the actual coordinate system of the workholding system may allow for machines to machine that part to the coordinate system of the actual workholding system rather than potentially needing to determine where the coordinate system of the part resides in space and adjusting the machining program to account for any differences. Importing the part into the coordinate system of the workholding system may potentially avoid trial and error to correctly account for any differences, thereby possibly improving inspection processes through uniform coordinate system alignment. In this respect, such trial and error that may result in improper inspection may be reduced if not eliminated, thereby saving time, increasing accuracy, etc. associated with inspection.

While described herein primarily with respect to the example of pECM, various aspects of the techniques may be applied to any type of machining, including CNC machining (a category of which pECM generally falls within). The techniques should not therefore be limited to the example of pECM discussed but may apply to any form of machining in which a reference model (or derivatives thereof) automates machining of workpieces to obtain machined parts. Furthermore, even in instances of machining that are not controlled by a reference model, various aspects of the techniques may facilitate automated inspection of machined parts to such reference models.

FIGS. 2A-2E are diagrams illustrating scans used to formulate the unified scan 123 of FIG. 1 in accordance with various aspects of the unified inspection techniques described in this disclosure. Referring first to the example of FIG. 2A, a workholding piece (WHP) scan 200 may represent an example of chuck scan 119. WHP scan 200 may define a surface geometry of a chuck 202 or other holding device for workpieces. Chuck 202 may include a hole or other void 203 capable of accepting a rod (or pin) of a locating plate, which—along with other features found on chuck and locating plate—effectively identifies the center of the coordinate system of chuck 202. Scanning module 116 (shown in the example of FIG. 1) may interface with a 3D metrology scanner to capture WHP scan 200 (and every other one of scans 204, 214, 220, and 230 shown in the examples of FIGS. 2B-2D), which may represent a scan having a precision of 10 or less millimeters.

Figure 2A:
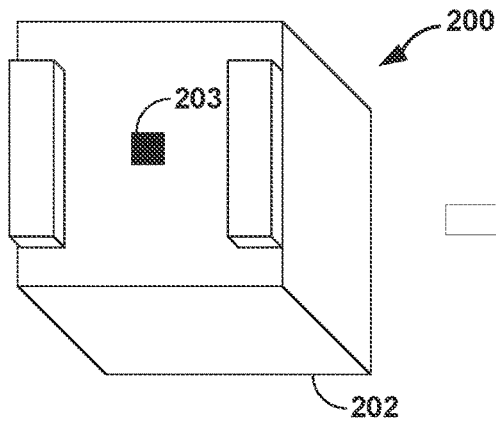
FIGS. 2A-2E are diagrams illustrating scans used to formulate an example unified scan in accordance with various aspects of the unified inspection techniques described in this disclosure.
Figure 2B:
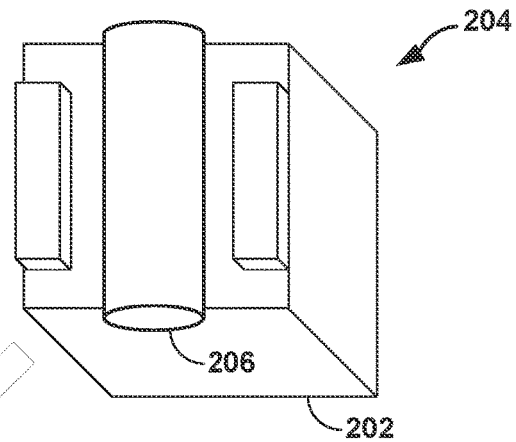
Figure 2C:
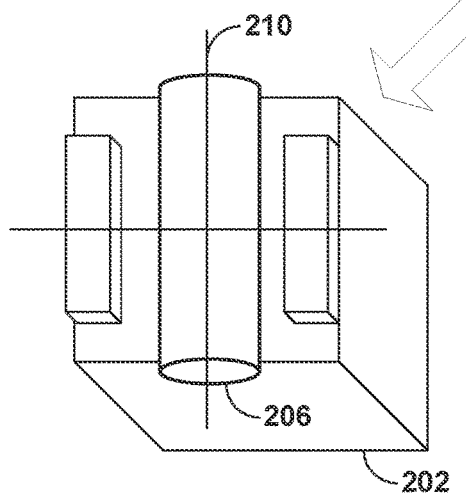

Referring next to the example of FIG. 2B, a workholding system (WHS) reference scan 204 may represent an example of CR scan 121 in which chuck 202 is scanned with a reference object 206 (which in this case represent a rod with known and precise geometrical measurements specifically used to determine a workholding piece's coordinate system) inserted into the locating plate attached to chuck 202 via void 203. A separate scan of the workholding piece with the reference object inserted may be required given that the scan only accounts for the surface of the workholding system, which the reference object obscuring void 203 by which to identify the center of chuck 202. Synthesis module 218 may process WHS reference scan 204 relative to WHP scan 200 to determine a coordinate system for chuck 202, which is shown in the example of FIG. 2C as coordinate system 210 overlaid upon WHS scan 204 to obtain modified WHP scan 214 (which may represent a combined scan and therefore be referred to as combined scan 214).

While the coordinate system 210 is shown in X-Y plane (or, in other words, the horizontal plane), coordinate system 210 may be defined in other planes, such as Z-plane (or in other words, the vertical plane). That is, for pECM devices, there may be a single plunge axis for the cathode relative to the underlying workpiece forming the anode. The coordinate system 210 may capture this plunge axis along the centerline of chuck 202. As such, coordinate system 210 may be aligned with a center of chuck 202 as shown in the examples of FIG. 2C, with the x-coordinate of zero and the y-coordinate of zero (0, 0) being indicative of the plunge axis.

Given the particularities of pECM and the variables described above that lead to some amount of uncertainty, the pECM device may experience fluctuations in etching depth along the plunge axis (particularly for single-axis pECM devices that only operate with respect to the plunge axis, rotating the workpiece via chuck 202 and moving the workpiece in the horizontal plane again via chuck 202 with high precision). In this respect, inspecting depth tolerances for the machined part may facilitate adjustments to the pECM variables that allow for precise machining of difficult materials without having to resort to repeated manual inspection that would slow down development and prototyping that may be required prior to entering larger scale production.

In this respect, the machined part (shown as machined part 234 in the example of FIG. 2E) may be machined using pECM having a single axis of machining. That is, the single axis of machining may include the z-axis in which a cathode of the pECM device descends towards a workpiece to perform pECM and thereby obtain machined part 234.

Figure 2D:
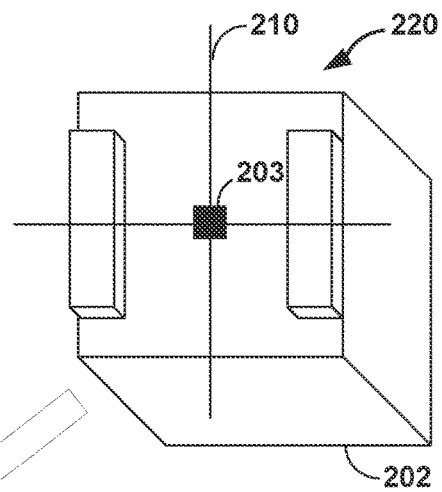
Figure 2E:
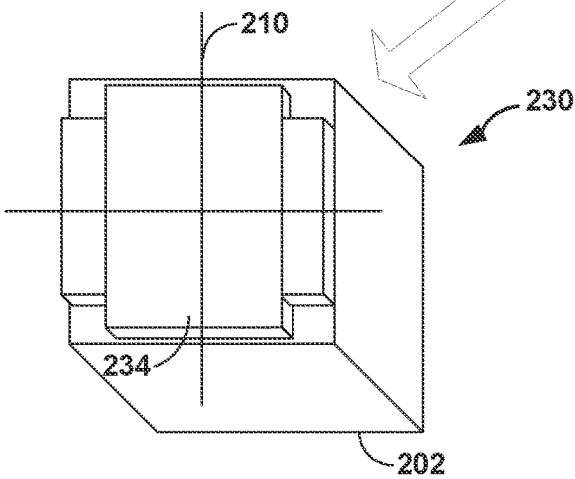

In any event, synthesis module 118 may import coordinate system 210 into the original WHP scan 200 to obtain an updated WHP scan 220 shown in the example of FIG. 2D. Synthesis module 118 may next align MP scan with updated WHP scan 220 to obtain unified scan 230 shown in the example of FIG. 2E. Synthesis module 118 may align MP scan with updated WHP scan 220 because the machined part is inserted into the same locating plate which fits into void 203 of chuck 202 (via the rod) in the same manner as reference object 206. Unified scan 230 (which may represent an example of unified scan 123) may represent machined part 232 overlaid upon chuck 202 that includes a coordinate system 210 defined relative to chuck 202. Given that unified scan 230 has a defined coordinate system 210, CAD module 114 may import unified scan 230 (e.g., as a point cloud) and align unified scan 230 with CAD model 115 by the same coordinate system, and thereby identify any compliance or non-compliance with tolerances (such as within some threshold relative to the ideal) specified by CAD model 115. That is CAD module 114 may compute a sequence of distances between points of the point cloud representative of unified scan 230 and points of the point cloud representative of CAD model 115.

Figure 3:
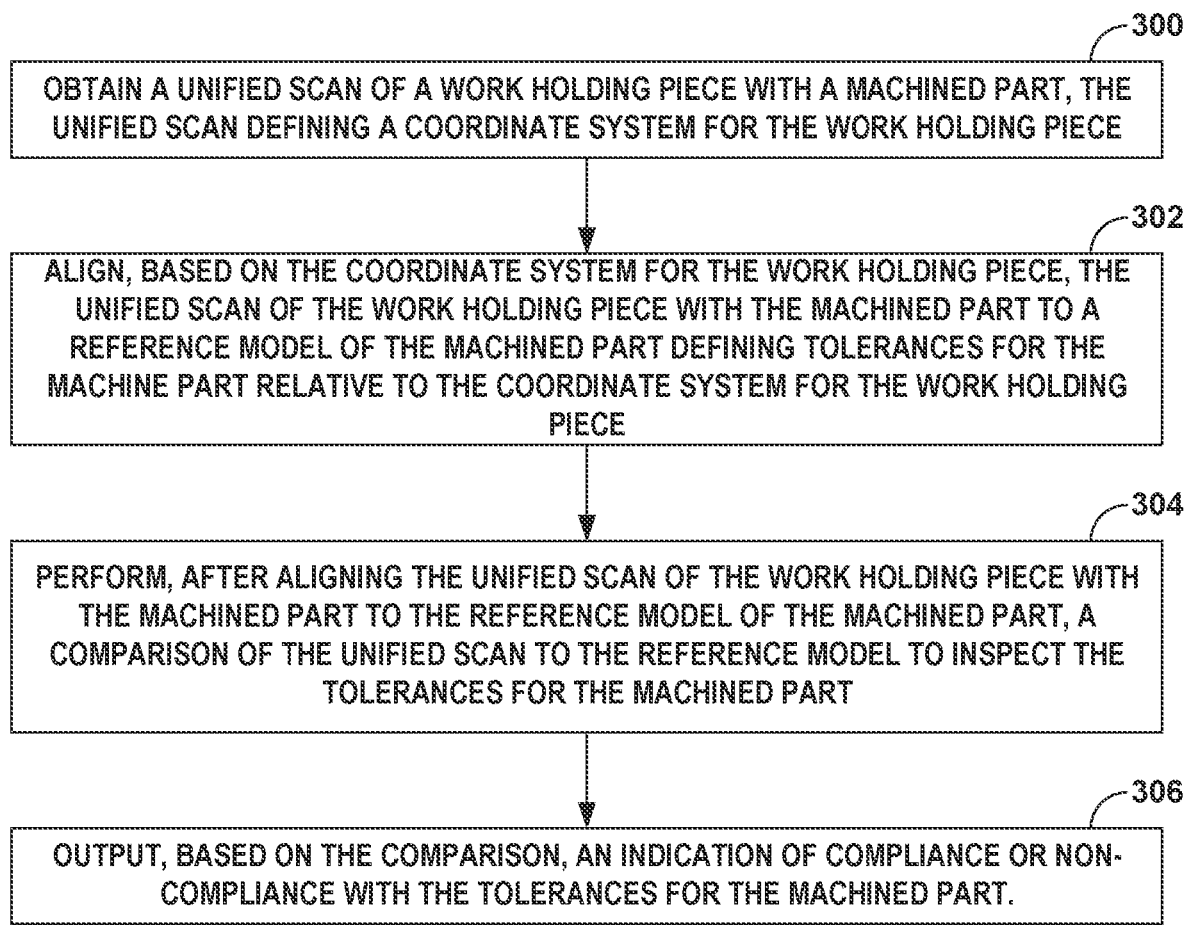
FIG. 3 is a flowchart illustrating example operation of computing device shown in the example of FIG. 1 in perform various aspects of the unified inspection techniques described in this disclosure.

FIG. 3 is a flowchart illustrating example operation of computing device shown in the example of FIG. 1 in performing various aspects of the unified inspection techniques described in this disclosure. Initially, processors 110 of computing device 100 may invoke scanning module 116 to capture one or more scans 117-121, which processors 110 pass to synthesis module 118 to obtain unified scan 123 of a workholding piece (such as chuck 202 shown in the examples of FIGS. 2A-2E) with a machined part (such as machined part 234), where the unified scan 123 defines a coordinate system 210 for chuck 202 (300).

Next, CAD module 114 may align, based on coordinate system 210 for chuck 202, unified scan 123 of chuck 202 with machined part 234 to a reference model (such as CAD model 115) of chuck 202 with machined part 234 defining tolerances for machine part 234 relative to coordinate system 210 for chuck 202 (302). CAD module 114 may perform, after aligning unified scan 123 of chuck 202 with machined part 234 to CAD model 115 of machined part 234, a comparison of unified scan 123 to CAD model 115 to inspect the tolerances for machined part 234 (304). CAD module 114 may output, based on the comparison, an indication of compliance or non-compliance with the tolerances for machined part 234.

Figure 4A:
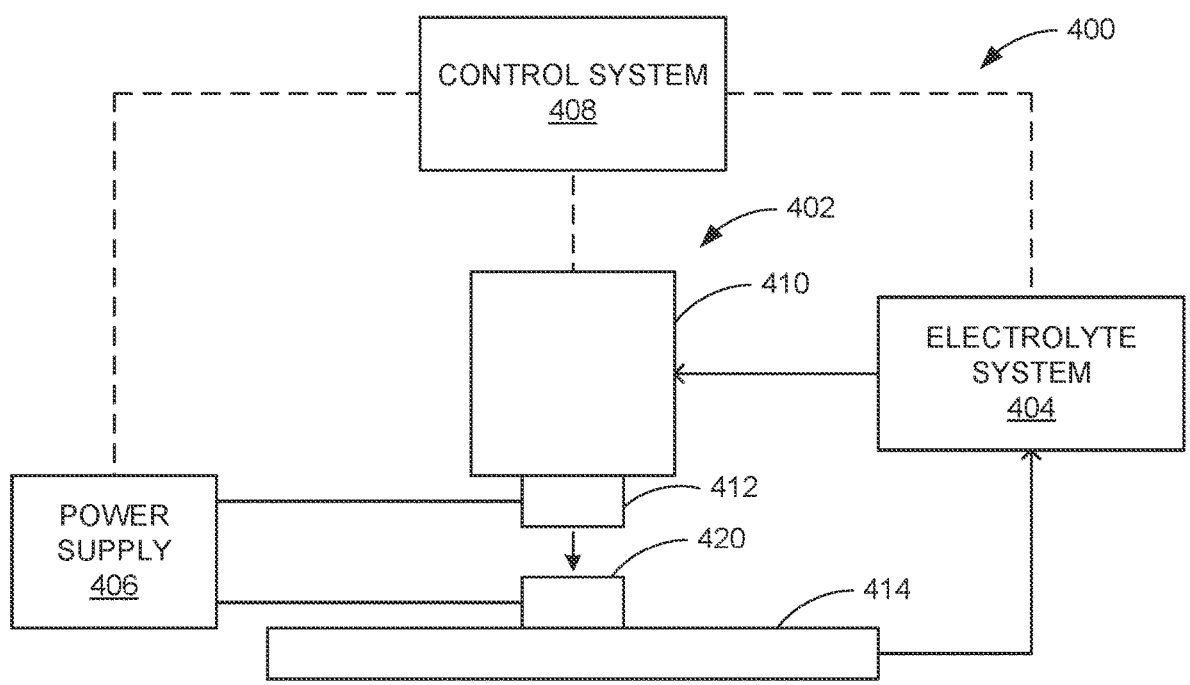
FIG. 4A is a conceptual block diagram illustrating a pulsed electrochemical machining (pECM) system.

FIG. 4A is a schematic conceptual block diagram illustrating an example pulsed electrochemical machining (pECM) system 400 for machining a workpiece 420. pECM system 400 includes a mechanical system 402, an electrolyte system 404, a power supply 406, and a control system 408. While illustrated as separate components, the various components of pECM system 400 may be integrated with other components (e.g., power supply 406 incorporated into mechanical system 402) or overlap with other components (e.g., controllers of mechanical system 402 overlapping with control system 408). While examples of the disclosure are described primarily with regard to pulsed electrochemical machining processes performed by pECM system 400, other examples of the disclosure may be employed using other machining techniques that employ electrochemical machining to shape or otherwise selectively remove material from a workpiece.

Mechanical system 402 may include an actuation system 410, a machining tool 412, and an enclosure system 414. Actuation system 410 may be configured to control a position of machining tool 412 relative to workpiece 420. During a pECM process, actuation system 410 may adjust the position of tool 412 relative to workpiece 420 as needed by moving tool 412, workpiece 420, or both. Actuation system 410 may include one or more actuators, such as direct drive actuators, configured to move tool 412 and/or workpiece 420 as desired during a pECM process. For examples, one or more actuators may be configured to feed or otherwise move machining tool 412 toward workpiece 420 during a pECM process. In some examples, actuation system 410 may be configured to oscillate machining tool 412 (e.g., along the z-axis shown in FIGS. 4B and 4C). Such movement of tool 412 by actuation system 410? may improve removal of dissolved material and restore a concentration of electrolyte between machining tool 412 and workpiece 420. As illustrated in the example of FIG. 4A, mechanical system 402 may be configured to receive electrolyte from electrolyte system 404 and discharge the electrolyte to or proximate to machining tool 412.

Machining tool 412 may be configured to mechanically couple to actuation system 410 and electrically couple to power supply 406. For example, machining tool 412 may include one or more structures or assemblies to couple to actuation system 410, such that machining tool 412 receives a control force for positioning machining tool 412, electrolyte (if distributed via mechanical system 402) for discharging from machining tool 412, and electrical current for generating an electric potential between machining tool 412 and workpiece 420. As will be described further in FIGS. 4B and 4C below, machining tool 412 may be configured to define a working surface that, in combination with workpiece 420 and the electrolyte supplied by electrolyte system 404, forms an electrolytic cell that dissolves material from the outer surface of workpiece 420 using electrolysis.

Enclosure system 414 may be configured to mount workpiece 420 and electrically couple workpiece 420 to power supply 406 for generating a voltage between machining tool 412 and workpiece 420 (e.g., in the form of a pulsed direct current). For example, enclosure system 414 may position workpiece 420 toward machining tool 412, such that a working surface of workpiece 420 is exposed to a working surface of machining tool 412. In some examples, enclosure system 414 may capture spent electrolyte from workpiece 420 for return to electrolyte system 404.

Electrolyte system 404 may be configured to condition and circulate electrolyte (e.g., liquid electrolyte) for distribution to a working surface of machining tool 412, such as via mechanical system 402. Electrolyte system 404 may include one or more pumps configured to discharge the electrolyte to mechanical system 402, one or more filters configured to filter contaminants from the electrolyte (e.g., for the re-use of electrolyte in the pECM process), one or more heat exchangers configured to remove heat from the electrolyte, and/or other components configured to maintain various parameters of the electrolyte.

Power supply 406 may be configured to generate an electric potential between machining tool 412 and workpiece 420. For example, power supply 406 may be configured to apply a voltage between machining tool 412 and workpiece 420 to generate current flow between machining tool 412 and workpiece 420 with the electrolyte flowing or otherwise present between machining tool 412 and workpiece 420. For a pulsed EMC process, power supply 406 may be configured to supply voltage in pulses, such as in combination with mechanical oscillations of machining tool 412 relative workpiece 420, to increase local current density. For example, power supply 406 may include a direct current (DC) source that applies a pulsed direct current to both machining tool 412 and workpiece 420 during the pulsed electrochemical machining process. In some examples, actuation system 410 may oscillate the position of machining tool 412 relative workpiece 420 in coordination with the pulsed direct current.

Control system 408 may be communicatively coupled to mechanical system 402, electrolyte system 404, and power supply 406, and configured to send control signals to mechanical system 402, electrolyte system 404, and power supply 406. For example, the control signals may cause mechanical system 402 to control (e.g., dynamically) a position of machining tool 412 relative to workpiece 420, cause electrolyte system 404 to supply electrolyte between machining tool 412 and workpiece 420, and cause power supply 406 to generate an electric potential between machining tool 412 and workpiece 420. Further operation of control system 408 will be described in FIG. 4D below.

Figure 4B:
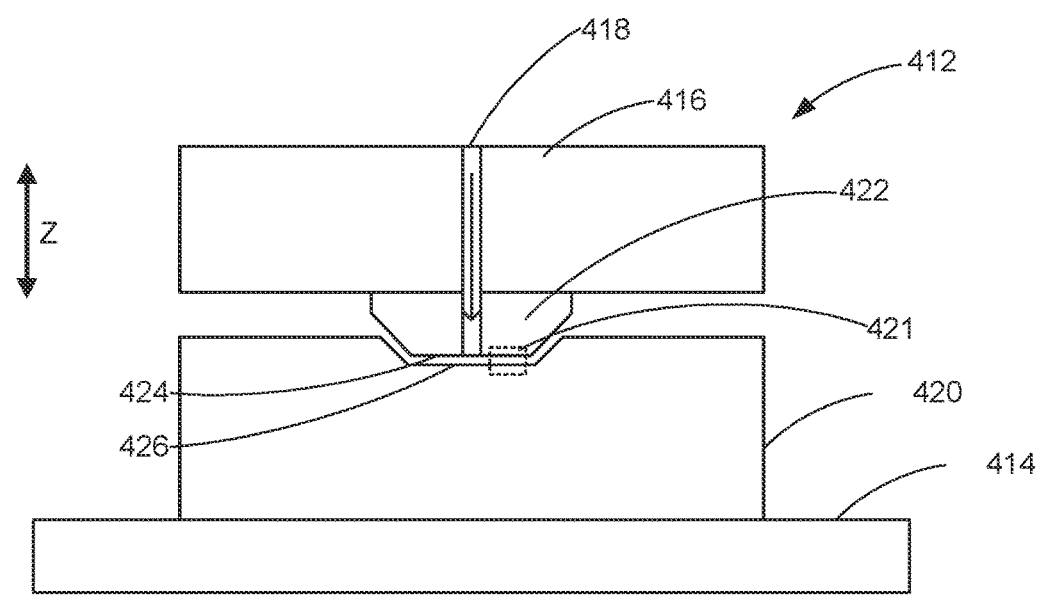
FIG. 4B is a side view cross-sectional conceptual diagram illustrating operation of a pECM tool of the pECM system of FIG. 4A.

Machining tool 412 defines a working surface that forms workpiece 420 into a component having a particular shape or set of dimensions (e.g., approximately the complimentary shape of machining tool 412). FIG. 4B is a side view cross-sectional conceptual diagram illustrating operation of machining tool 412 of pECM system 400 of FIG. 4A. Machining tool 412 includes a tool body 416 defining a tool axis that aligns with an axis of actuation system 410 of FIG. 4A. Tool body 416 includes one or more electrodes 422 (one or more cathodes). While illustrated in FIG. 4B as including a single electrode 422, tool body 416 may include multiple electrodes 422. Each electrode 422 defines a working surface 424 at a distal end of the tool axis. When machining tool 412 is attached to actuation system 410, each working surface 424 is configured to face a corresponding target surface 426 of workpiece 420. In some examples, such as illustrated in FIG. 4B, tool body 416 may include an electrolyte channel 418 configured to receive an electrolyte from electrolyte system 404 (e.g., via mechanical system 402) and discharge the electrolyte through one or more openings near working surface 424 of electrode 422.

Each electrode 422 includes an electrically conductive material at working surface 424. Likewise, workpiece 420 may be an electrically conductive material. When an electric potential (e.g., in the form of a pulse direct current) is generated between working surface 424 of electrode 422 and target surface 426 of workpiece 420 (e.g., with power supply under the control of control system 408), working surface 424 may form a cathode surface and target surface 426 may form an anode surface. As working surface 424 is advanced and material from workpiece 420 is removed, a shape of target surface 426 may generally correspond to the complimentary shape of working surface 424. While the shape of workpiece 420 is shown to mirror the shape of electrode 422 in FIG. 4B, in other examples, the dimensions and shape formed in workpiece 420 from the removal of material from workpiece 420 do not exactly mirror the shape of the tool 412.

The conductive materials of electrode(s) 422 and workpiece 420 may be any suitable conductive material such as metal, metal alloy, or ceramic material. Examples of metals that may be used to form the workpiece 420 and the electrode(s) 422 of tool 412 include nickel, iron, and titanium-based alloys in a variety of formats such as cast (including single crystal), forged, additively manufactured, and powdered metallurgy. Examples of suitable metals and metal alloys for the workpiece 420 and electrode(s) 422 of tool 412 include, but are not limited to, any superalloy such as CMSX-4, MarM247, Haynes 230, Rene N-5, MP35N, and the like, steels such as 4140, A2 tool steel, M4 tool steel, and gear steels such as Ferrium C64, Al 6061, Al 7075, brass, bronze, CoCr, Cu, Ge, Inconels such as 625, 718, and 740h, Mo, Ni, Nitinol, Nitronic 60, Pyrowear 53, stainless steels such as 17-4, 304, 316, and 440C, Ti Grade 1-5, Ti 64, TiAl, and mixtures and combinations thereof.

Figure 4C:
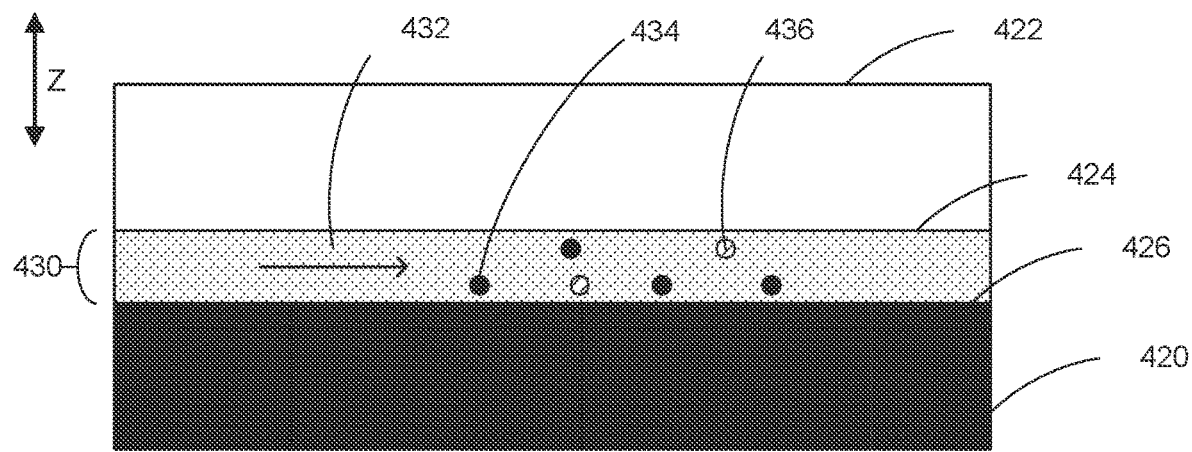
FIG. 4C is a side view cross-sectional conceptual diagram illustrating a magnified view of a portion of FIG. 4B.

FIG. 4C is a side view cross-sectional conceptual diagram showing a magnified view within window 421 indicated in FIG. 4B to illustrate operating principles of the pECM tool of FIG. 4B. Working surface 424 of electrode 422 is positioned relative to target surface 426 of workpiece 420 to form an interelectrode gap 430, and an electrolyte 432 flows through interelectrode gap 430. When an electric potential (e.g., in the form of a pulse direct current) is generated between working surface 424 and target surface 426, current flows from working surface 424 to target surface 426 via electrolyte 432 to form an electrolytic cell. The current dissolves material at target surface 426 to generate electrochemical reaction products that include dissolved material 434, hydrogen gas 436, and heat. Electrolyte 432 carries away the electrochemical reaction products from interelectrode gap 430. In general, material removal rate may be related to current density in interelectrode gap 430. The current density in interelectrode gap 430 may be related to a variety of parameters including, but not limited to: spatial parameters, such as a distance of interelectrode gap 430; electrical parameters, such as an electric potential across interelectrode gap 430; electrolyte parameters, such as a flow rate of electrolyte 432; and other parameters that may affect flow of current from working surface 424 to target surface 426.

Figure 4D:
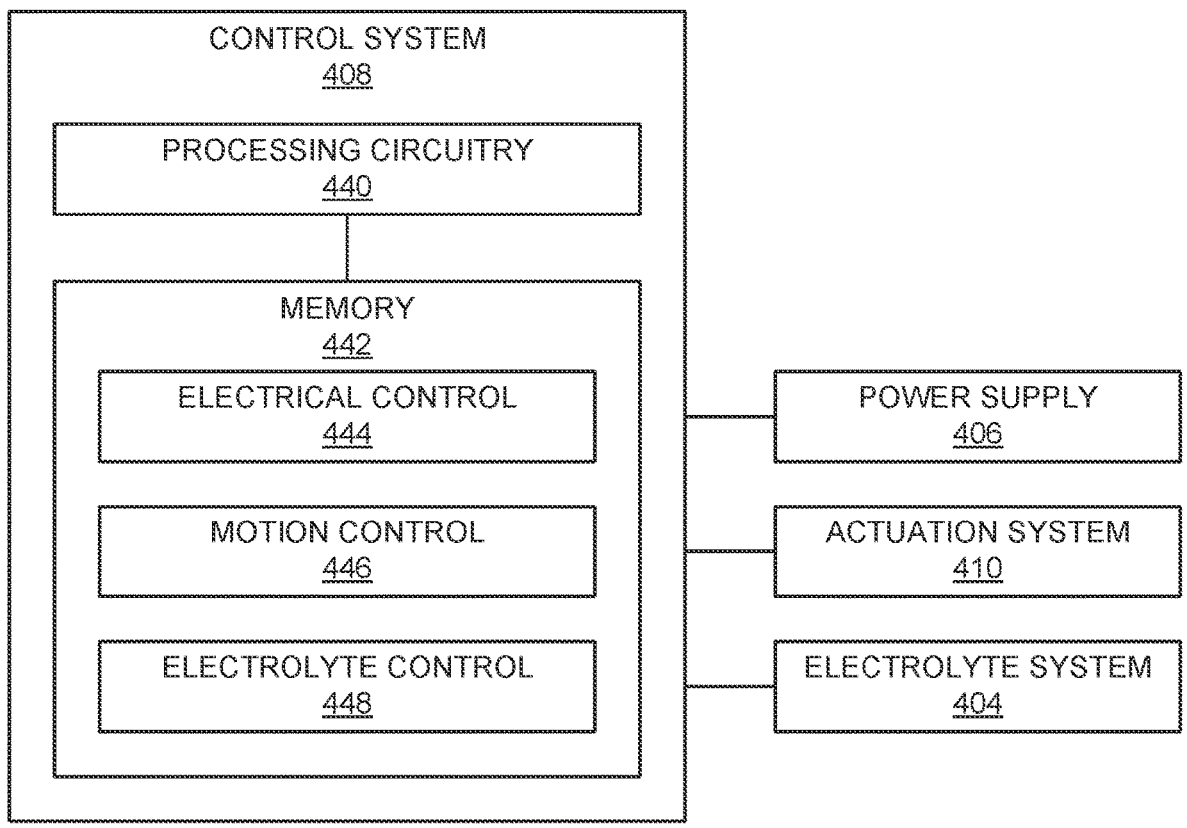
FIG. 4D is a conceptual block diagram illustrating an example control system of the pECM system of FIG. 4A.

FIG. 4D is a conceptual block diagram illustrating an example control system 408 of pECM system 400 of FIG. 4A. Control system 408 includes processing circuitry 440 and a memory 442. Memory 442 includes computer-readable instructions that, when executed by processing circuitry 440, causes processing circuitry 440 to perform various functions related to control of components of pECM system 400. Processing circuitry 440 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry 440 herein may be embodied as software, firmware, hardware or any combination thereof. Memory 442 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Memory 442 may store any suitable information, including information for executing one or more electrochemical machining processes with which pECM system 400 performs on workpiece 420. For example, memory 442 may store one or more of electrical control instructions 444, motion control instructions 446, and electrolyte control instruction 448 in separate memories within memory 442 or separate areas within memory 442. Electrical control 444, motion control 446, and electrolyte control 448 may, in combination, define parameters that control pECM system 400 to remove material from workpiece 420 to generate a component having particular dimensions. In some examples, workpiece 420 may be a partially fabricated component having relatively rough dimensions, such that the pECM process may further refine workpiece 420 to relatively fine dimensions.

Electrical control 444 may define values for electrical parameters of a pECM process including, but not limited to, voltage amplitude applied to electrode 422 and workpiece 420, frequency of electric current, duty cycle (e.g., pulse length), current amplitude, and other electric parameters associated with control of current across interelectrode gap 430. Processing circuitry 440 may generate and send control signals that include the electrical parameters to electrical control circuitry of power supply 406.

Motion control 446 may define values for motion parameters of a pECM process including, but not limited to, feed rate of machining tool 412, position of machining tool 412 (e.g., depth limit of machining tool 412), frequency of oscillation of machining tool 412, amplitude of oscillation of machining tool 412, length of interelectrode gap 430, and other motion parameters associated with control of relative and/or time-varying position of working surface 424. Processing circuitry 440 may generate and send control signals that include the motion parameters to actuation circuitry of actuation system 410.

Electrolyte control 448 may define values for electrolyte parameters of a pECM process including, but not limited to, flow rate of electrolyte 432 through interelectrode gap 430, temperature of electrolyte 432, and other electrolyte parameters associated with conditions of electrolyte 432 in interelectrode gap 430. Processing circuitry 440 may generate and send control signals that include the electrolyte parameters to electrolyte control circuitry of electrolyte system 404.

Figure 4E:
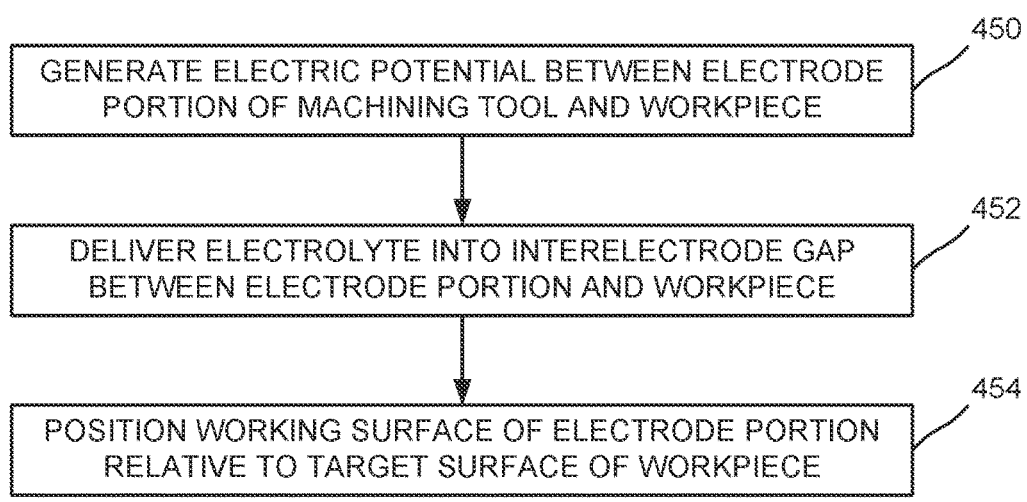
FIG. 4E is a flow diagram illustrating an example technique for controlling the pECM system of FIG. 4A.

FIG. 4E is a flow diagram illustrating an example technique for controlling pECM system 400 of FIG. 4A. While illustrated sequentially, the various steps of FIG. 4E may be initiated in a different order (or sequentially) to remove material from workpiece 420. Control system 408 may cause power supply 406 to generate an electric potential between electrode 422 and workpiece 420 (150) and cause electrolyte system 404 to deliver electrolyte 432 into interelectrode gap 430 between working surface 424 of electrode 422 and target surface 426 of workpiece 420 (452) to form an electrolytic cell. Control system 408 may cause actuation system 410 to position working surface 424 of electrode 422 relative to target surface 426 of workpiece 420 (454) to control the size of interelectrode gap 430 and advance working surface 424 toward target surface 426 as material is removed from workpiece 420. In some examples, interelectrode gap 430 may be on the order of about 10 microns although other values are contemplated.

In this respect, various aspects of the techniques may enable the following examples.

Example 1. A device comprising: a memory configured to store: a unified scan of a workholding piece with a machined part, the unified scan defining a coordinate system for the workholding piece; and a reference model of the machined part, the reference model defining tolerances for the machine part relative to the coordinate system for the workholding piece; and one or more processors configured to: align, based on the coordinate system for the workholding piece, the unified scan of the workholding piece with the machined part to the reference model of the workholding piece with the machined part; perform, after aligning the unified scan of the workholding piece with the machined part to reference model of the workholding piece with the machined part, a comparison of the unified scan of the workholding piece with the machined part to the reference model to inspect the tolerances for the machined part; and output, based on the comparison, an indication of compliance or non-compliance with the tolerances for the machined part.

Example 2. The device of example 1, wherein the one or more processors are further configured to: obtain a first scan of the workholding piece; obtain a second scan of the machined part; and generate, based on the first scan and the second scan, the unified scan of the workholding piece with the machined part.

Example 3. The device of example 2, wherein the first scan comprises a first three-dimensional metrology scan of the workholding piece having a precision of 10 or less millimeters, and wherein the second scan comprises a second three-dimensional metrology scan of the machined part having a precision of 10 or less millimeters.

Example 4. The device of any combination of examples 1-3, wherein the one or more processors are further configured to: obtain a first scan of the workholding piece; obtain a second scan of the workholding piece with a reference object defining the coordinate system for the workholding piece; and process the first scan and the second scan to obtain a combined scan of the workholding piece defining the coordinate system for the workholding piece.

Example 5. The device of example 4, wherein the one or more processors are further configured to: obtain a third scan of the machined part in the workholding piece; and align the third scan of the machined part with the combined scan of the workholding piece defining the coordinate system for the workholding piece to obtain the unified scan of the workholding piece with the machined part.

Example 6. The device of any combination of examples 1-5, wherein the machined part has been machined using precision electrochemical machining (pECM).

Example 7. The device of any combination of examples 1-6, wherein the machined part has been machined using precision electrochemical machining (pECM) having a single axis of machining.

Example 8. The device of example 7, wherein the single axis of machining comprises a z-axis in which a cathode of a pECM device descends towards a workpiece to perform pECM and thereby obtain the machined part.

Example 9. The device of any combination of examples 1-8, wherein the one or more processors are, when configured to align the unified scan of the workholding piece with the machined part to the reference model of the workholding piece with the machined part, configured to automatically align, based on the coordinate system for the workholding piece, the unified scan of the workholding piece with the machined part to the reference model of the workholding piece with the machined part, and wherein the one or more processors are, when configured to perform the comparison, configured to automatically perform the comparison, after aligning the unified scan of the workholding piece with the machined part to the reference model of the workholding piece with the machined part, of the unified scan of the workholding piece with the machined part to the reference model to inspect the tolerances for the machined parts.

Example 10. The device of any combination of examples 1-9, wherein the model of the machined part comprises a computer-aided design model of the machined part.

Example 11. The device of any combination of examples 1-10, wherein the workholding piece comprises a precision-tooled chuck.

Example 12. A method comprising: obtaining a unified scan of a workholding piece with a machined part, the unified scan defining a coordinate system for the workholding piece; aligning, based on the coordinate system for the workholding piece, the unified scan of the workholding piece with the machined part to a reference model of the workholding piece with the machined part defining tolerances for the machine part relative to the coordinate system for the workholding piece; performing, after aligning the unified scan of the workholding piece with the machined part to the reference model of the workholding piece with the machined part, a comparison of the unified scan of the workholding piece with the machined part to the reference model to inspect the tolerances for the machined part; and outputting, based on the comparison, an indication of compliance or non-compliance with the tolerances for the machined part.

Example 13. The method of example 12, further comprising: obtaining a first scan of the workholding piece; obtaining a second scan of the machined part; and generating, based on the first scan and the second scan, the unified scan of the workholding piece with the machined part.

Example 14. The method of example 13, wherein the first scan comprises a first three-dimensional metrology scan of the workholding piece having a precision of 10 or less millimeters, and wherein the second scan comprises a second three-dimensional metrology scan of the machined part having a precision of 10 or less millimeters.

Example 15. The method of any combination of examples 12-14, further comprising: obtaining a first scan of the workholding piece; obtaining a second scan of the workholding piece with a reference object defining the coordinate system for the workholding piece; and processing the first scan and the second scan to obtain a combined scan of the workholding piece defining the coordinate system for the workholding piece.

Example 16. The method of example 15, further comprising: obtaining a third scan of the machined part in the workholding piece; and aligning the third scan of the machined part with the combined scan of the workholding piece defining the coordinate system for the workholding piece to obtain the unified scan of the workholding piece with the machined part.

Example 17. The method of any combination of examples 12-16, wherein the machined part has been machined using precision electrochemical machining (pECM).

Example 18. The method of example 17, wherein the single axis of machining comprises a z-axis in which a cathode of a pECM device descends towards a workpiece to perform pECM and thereby obtain the machined part.

Example 19. The method of any combination of examples 12-18, wherein aligning the unified scan of the workholding piece with the machined part to the reference model of the workholding piece with the machined part comprises automatically aligning, based on the coordinate system for the workholding piece, the unified scan of the workholding piece with the machined part to the reference model of the workholding piece with the machined part, and wherein performing the comparison comprises automatically performing the comparison, after aligning the unified scan of the workholding piece with the machined part to the reference model of the workholding piece with the machined part, of the unified scan of the workholding piece with the machined part to the reference model to inspect the tolerances for the machined parts.

Example 20. A non-transitory computer-readable storage medium having instructions stored thereon that, when executed, cause one or more processors to: obtain a unified scan of a workholding piece with a machined part, the unified scan defining a coordinate system for the workholding piece; align, based on the coordinate system for the workholding piece, the unified scan of the workholding piece with the machined part to a reference model of the workholding piece with the machined part defining tolerances for the machine part relative to the coordinate system for the workholding piece; perform, after aligning the unified scan of the workholding piece with the machined part to the reference model of the workholding piece with the machined part, a comparison of the unified scan of the workholding piece with the machined part to the reference model to inspect the tolerances for the machined parts; and output, based on the comparison, an indication of compliance or non-compliance with the tolerances for the machined part.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A device comprising:
a memory configured to store:
a unified scan of a workholding piece with a machined part, the unified scan defining a coordinate system for the workholding piece; and
a reference model of the machined part, the reference model defining tolerances for the machined part relative to the coordinate system for the workholding piece; and
one or more processors configured to:
align, based on the coordinate system for the workholding piece, the unified scan of the workholding piece with the machined part to the reference model of the workholding piece with the machined part;
perform, after aligning the unified scan of the workholding piece with the machined part to reference model of the workholding piece with the machined part, a comparison of the unified scan of the workholding piece with the machined part to the reference model to inspect the tolerances for the machined part;
output, based on the comparison, an indication of compliance or non-compliance with the tolerances for the machined part;
responsive to outputting the indication of non-compliance with the tolerances for the machined part, send a control signal including one or more adjusted parameters to control one or more machining processes for machining the machined part; and
execute, based on the control signal, the one or more machining processes to machine the machined part.

2. The device of claim 1, wherein the one or more processors are further configured to:
obtain a first scan of the workholding piece;
obtain a second scan of the machined part; and
generate, based on the first scan and the second scan, the unified scan of the workholding piece with the machined part.

3. The device of claim 2,
wherein the first scan comprises a first three-dimensional metrology scan of the workholding piece having a precision of 10 or less millimeters, and
wherein the second scan comprises a second three-dimensional metrology scan of the machined part having a precision of 10 or less millimeters.

4. The device of claim 1, wherein the one or more processors are further configured to:
obtain a first scan of the workholding piece;
obtain a second scan of the workholding piece with a reference object defining the coordinate system for the workholding piece; and
process the first scan and the second scan to obtain a combined scan of the workholding piece defining the coordinate system for the workholding piece.

5. The device of claim 4, wherein the one or more processors are further configured to:
obtain a third scan of the machined part in the workholding piece; and
align the third scan of the machined part with the combined scan of the workholding piece defining the coordinate system for the workholding piece to obtain the unified scan of the workholding piece with the machined part.

6. The device of claim 1, wherein the machined part has been machined using precision electrochemical machining (pECM).

7. The device of claim 1, wherein the machined part has been machined using precision electrochemical machining (pECM) having a single axis of machining.

8. The device of claim 7, wherein the single axis of machining comprises a z-axis in which a cathode of a pECM device descends towards a workpiece to perform pECM and thereby obtain the machined part.

9. The device of claim 1,
wherein the one or more processors are, when configured to align the unified scan of the workholding piece with the machined part to the reference model of the workholding piece with the machined part, configured to automatically align, based on the coordinate system for the workholding piece, the unified scan of the workholding piece with the machined part to the reference model of the workholding piece with the machined part, and
wherein the one or more processors are, when configured to perform the comparison, configured to automatically perform the comparison, after aligning the unified scan of the workholding piece with the machined part to the reference model of the workholding piece with the machined part, of the unified scan of the workholding piece with the machined part to the reference model to inspect the tolerances for the machined part.

10. The device of claim 1, wherein the reference model of the machined part comprises a computer-aided design model of the machined part.

11. The device of claim 1, wherein the workholding piece comprises a precision tooled chuck.

12. A method comprising:
obtaining a unified scan of a workholding piece with a machined part, the unified scan defining a coordinate system for the workholding piece;
aligning, based on the coordinate system for the workholding piece, the unified scan of the workholding piece with the machined part to a reference model of the workholding piece with the machined part defining tolerances for the machined part relative to the coordinate system for the workholding piece;

performing, after aligning the unified scan of the workholding piece with the machined part to the reference model of the workholding piece with the machined part, a comparison of the unified scan of the workholding piece with the machined part to the reference model to inspect the tolerances for the machined part;

outputting, based on the comparison, an indication of compliance or non-compliance with the tolerances for the machined part;

responsive to outputting the indication of non-compliance with the tolerances for the machined part, sending a control signal including one or more adjusted parameters to control one or more machining processes for machining the machined part; and executing, based on the control signal, the one or more machining processes to machine the machined part.

13. The method of claim 12, further comprising:
obtaining a first scan of the workholding piece;
obtaining a second scan of the machined part; and
generating, based on the first scan and the second scan, the unified scan of the workholding piece with the machined part.

14. The method of claim 13,
wherein the first scan comprises a first three-dimensional metrology scan of the workholding piece having a precision of 10 or less millimeters, and
wherein the second scan comprises a second three-dimensional metrology scan of the machined part having a precision of 10 or less millimeters.

15. The method of claim 12, further comprising:
obtaining a first scan of the workholding piece;
obtaining a second scan of the workholding piece with a reference object defining the coordinate system for the workholding piece; and
processing the first scan and the second scan to obtain a combined scan of the workholding piece defining the coordinate system for the workholding piece.

16. The method of claim 15, further comprising:
obtaining a third scan of the machined part in the workholding piece; and
aligning the third scan of the machined part with the combined scan of the workholding piece defining the coordinate system for the workholding piece to obtain the unified scan of the workholding piece with the machined part.

17. The method of claim 12, wherein the machined part has been machined using pulsed electrochemical machining (pECM).

18. The method of claim 17, wherein a single axis of machining comprises a z-axis in which a cathode of a pECM device descends towards a workpiece to perform pECM and thereby obtain the machined part.

19. The method of claim 12,
wherein aligning the unified scan of the workholding piece with the machined part to the reference model of the workholding piece with the machined part comprises automatically aligning, based on the coordinate system for the workholding piece, the unified scan of the workholding piece with the machined part to the reference model of the workholding piece with the machined part, and
wherein performing the comparison comprises automatically performing the comparison, after aligning the unified scan of the workholding piece with the machined part to the reference model of the workholding piece with the machined part, of the unified scan of the workholding piece with the machined part to the reference model to inspect the tolerances for the machined part.

20. A non-transitory computer-readable storage medium having instructions stored thereon that, when executed, cause one or more processors to:

obtain a unified scan of a workholding piece with a machined part, the unified scan defining a coordinate system for the workholding piece;

align, based on the coordinate system for the workholding piece, the unified scan of the workholding piece with the machined part to a reference model of the workholding piece with the machined part defining tolerances for the machined part relative to the coordinate system for the workholding piece;

perform, after aligning the unified scan of the workholding piece with the machined part to the reference model of the workholding piece with the machined part, a comparison of the unified scan of the workholding piece with the machined part to the reference model to inspect the tolerances for the machined part;

output, based on the comparison, an indication of compliance or non-compliance with the tolerances for the machined part;

responsive to outputting the indication of non-compliance with the tolerances for the machined part, send a control signal including one or more adjusted parameters to control one or more machining processes for machining the machined part; and execute, based on the control signal, the one or more machining processes to machine the machined part.

* * * * *